US007815127B2

(12) United States Patent
Beatty et al.

(10) Patent No.: US 7,815,127 B2
(45) Date of Patent: *Oct. 19, 2010

(54) HUMIDITY CONTROL METHOD AND APPARATUS FOR USE IN AN ENCLOSED ASSEMBLY

(75) Inventors: Paul A. Beatty, Fort Collins, CO (US); James H. Smith, Woodside, CO (US); Robert A. Bruce, Longmont, CO (US); Michael D. Ries, Fort Collins, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/355,520

(22) Filed: Jan. 16, 2009

(65) Prior Publication Data

US 2009/0121032 A1    May 14, 2009

Related U.S. Application Data

(63) Continuation of application No. 10/970,960, filed on Oct. 22, 2004, now Pat. No. 7,478,760.

(60) Provisional application No. 60/548,028, filed on Feb. 26, 2004.

(51) Int. Cl.
*F24F 3/14* (2006.01)
*F24F 11/00* (2006.01)
*B01F 3/02* (2006.01)
*G11B 33/14* (2006.01)

(52) U.S. Cl. ............ 236/44 A; 236/44 R; 360/97.02

(58) Field of Classification Search .......... 236/44 A, 236/44 R; 96/134, 135, 139, 154; 55/385.6, 55/486, DIG. 12; 360/97.02, 97.03
See application file for complete search history.

(56) References Cited

U.S. PATENT DOCUMENTS

| 3,669,103 A | 6/1972 | Harper |
| 3,810,468 A | 5/1974 | Harper |
| 4,614,528 A | 9/1986 | Lennen |
| 4,620,248 A | 10/1986 | Gitzendanner |
| 4,707,290 A | 11/1987 | Seiter |
| 4,783,510 A | 11/1988 | Saotome |
| 4,831,475 A | 5/1989 | Kakuda |
| 4,959,061 A | 9/1990 | Cabestany |
| 5,075,807 A | 12/1991 | Inoue |
| 5,124,856 A | 6/1992 | Brown |
| 5,293,286 A | 3/1994 | Hasegawa |

(Continued)

OTHER PUBLICATIONS

Donna Narsavage-Heald, Thermal Polyaspartate as a Biodegradable Alternative to Polyacrylate and Other Currently Used Water Soluble Polymer, Scranton Green Chemistry, 2005, pp. 1-6 (Jul. 2005).

*Primary Examiner*—Chen-Wen Jiang
(74) *Attorney, Agent, or Firm*—Campbell Nelson Whipps LLC

(57) ABSTRACT

A humidity control method and apparatus that can be utilized to provide humidity control within an enclosed assembly such as a disc drive. The apparatus includes a container that is at least partially formed of a material through which water vapor can freely move. The apparatus also includes a humidity-controlling mixture that comprises at least one salt and a superabsorbent polymer. The humidity-controlling mixture is enclosed within the container.

7 Claims, 8 Drawing Sheets

U.S. PATENT DOCUMENTS

| | | |
|---|---|---|
| 5,392,177 A | 2/1995 | Chainer |
| 5,506,035 A | 4/1996 | Van Phan |
| 5,743,942 A | 4/1998 | Shelley |
| 5,795,439 A | 8/1998 | Euripides |
| 5,842,597 A | 12/1998 | Kraus |
| 6,059,860 A | 5/2000 | Larson |
| 6,077,335 A | 6/2000 | Schneider |
| 6,110,533 A | 8/2000 | Cote |
| 6,116,029 A | 9/2000 | Krawec |
| 6,296,691 B1 | 10/2001 | Gidumal |
| 6,399,730 B1 | 6/2002 | Freeman |
| 6,475,269 B1 | 11/2002 | Turner |
| 6,475,270 B1 | 11/2002 | Graeve |
| 6,491,741 B2 | 12/2002 | Tuma |
| 6,587,307 B1 | 7/2003 | Raymond |
| 6,654,201 B2 | 11/2003 | Smith |
| 6,665,150 B2 | 12/2003 | Smith |
| 6,703,451 B2 | 3/2004 | Hosokawa |
| 7,201,841 B2 | 4/2007 | Hughes |
| 7,478,760 B2 * | 1/2009 | Beatty et al. ............... 236/44 A |
| 2002/0034040 A1 | 3/2002 | Tomioka |
| 2003/0235664 A1 | 12/2003 | Merical |
| 2004/0149634 A1 | 8/2004 | Hughes |
| 2004/0157734 A1 * | 8/2004 | Mertens et al. ............. 502/401 |
| 2006/0086813 A1 | 4/2006 | Beatty |
| 2008/0196591 A1 | 8/2008 | Smith |

* cited by examiner

HUMIDITY CONTROL METHOD AND APPARATUS FOR USE IN AN ENCLOSED ASSEMBLY

CROSS-REFERENCE TO RELATED APPLICATION

The present application is a Continuation of and claims priority of U.S. patent application Ser. No. 10/970,960, filed Oct. 22, 2004 which is based on and claims the benefit of U.S. Provisional Application 60/548,028 filed on Feb. 26, 2004 for inventors Paul A. Beatty, Robert A. Bruce, Michael D. Ries and James H. Smith and entitled "DEVICE FOR HARD DISK DRIVE INTERNAL HUMIDITY CONTROL."

FIELD OF THE INVENTION

The present invention relates generally to humidity control in enclosed assemblies, and more particularly but not by limitation to humidity control in data storage devices such as disc drives.

BACKGROUND OF THE INVENTION

Disc drives are used for data storage in modern electronic products ranging from digital cameras to computer systems and networks. Typically, a disc drive includes a mechanical portion, or head disc assembly (HDA), and electronics in the form of a printed circuit board assembly (PCBA), mounted to an outer surface of the HDA. The PCBA controls HDA functions and provides an interface between the disc drive and its host.

Generally, a HDA comprises moving parts such as one or more magnetic discs affixed to a spindle motor assembly for rotation at a constant speed, an actuator assembly supporting an array of read/write heads that traverse generally concentric data tracks radially spaced across the disc surfaces and a voice coil motor (VCM) providing rotational motion to the actuator assembly.

A disc drive unit typically includes a housing that protects the workings of the drive from particulates and other contamination. Control of the internal relative humidity (RH) within the housing of the disc drive is desirable since the moisture content of the surrounding air affects the performance and reliability of the head/disc interface (HDI), a crucial part of the disc drive recording system. For example, it is known that head-to-disc stiction and media corrosion are aggravated by high relative humidity levels. As a further example, excessive disc wear has been observed under conditions of very low relative humidity.

A majority of commercial hard disc drive products incorporate elements that limit the rate of moisture exchange between drive interior and the environment. Such elements include seals, diffusion tubes, carbon absorbers, and desiccants. The effect of these elements is simply to delay changes in relative humidity. They do not control relative humidity levels to a given level, nor do they prevent eventual equilibration over the full range of external (ambient) relative humidity (from 0 to 100%). Commonly used methods to control RH in general commercial applications require costly elements and/or systems (such as sensors, control electronics and software, evaporators, condensers, etc.) that preclude their use in hard disc drives and other such assemblies that include moving parts.

Embodiments of the present invention provide solutions to these and other problems, and offer other advantages over the prior art.

SUMMARY OF THE INVENTION

Disclosed is a humidity control method and apparatus that can be utilized to provide humidity control within an enclosed assembly such as a disc drive. The apparatus includes a container that is at least partially formed of a material through which water vapor can freely move. The apparatus also includes a humidity-controlling mixture that comprises at least one salt and a superabsorbent polymer. The humidity-controlling mixture is enclosed within the container.

Other features and benefits that characterize embodiments of the present invention will be apparent upon reading the following detailed description and review of the associated drawings.

DETAILED DESCRIPTION OF ILLUSTRATIVE EMBODIMENTS

Disclosed is a humidity control method and apparatus for use in an enclosed assembly. The humidity control system of the present invention is capable of countering changes in relative humidity (RH) due to transport of water vapor into and out of the enclosed assembly (such as a disc drive) in order to maintain relatively constant humidity conditions inside the drive within tight limits over the entire operating temperature range of the drive. It should be noted that the humidity control system of the present invention is capable of maintaining relatively constant humidity conditions within the enclosed assembly for a significant time period (not just for a day or two).

Figure 1:
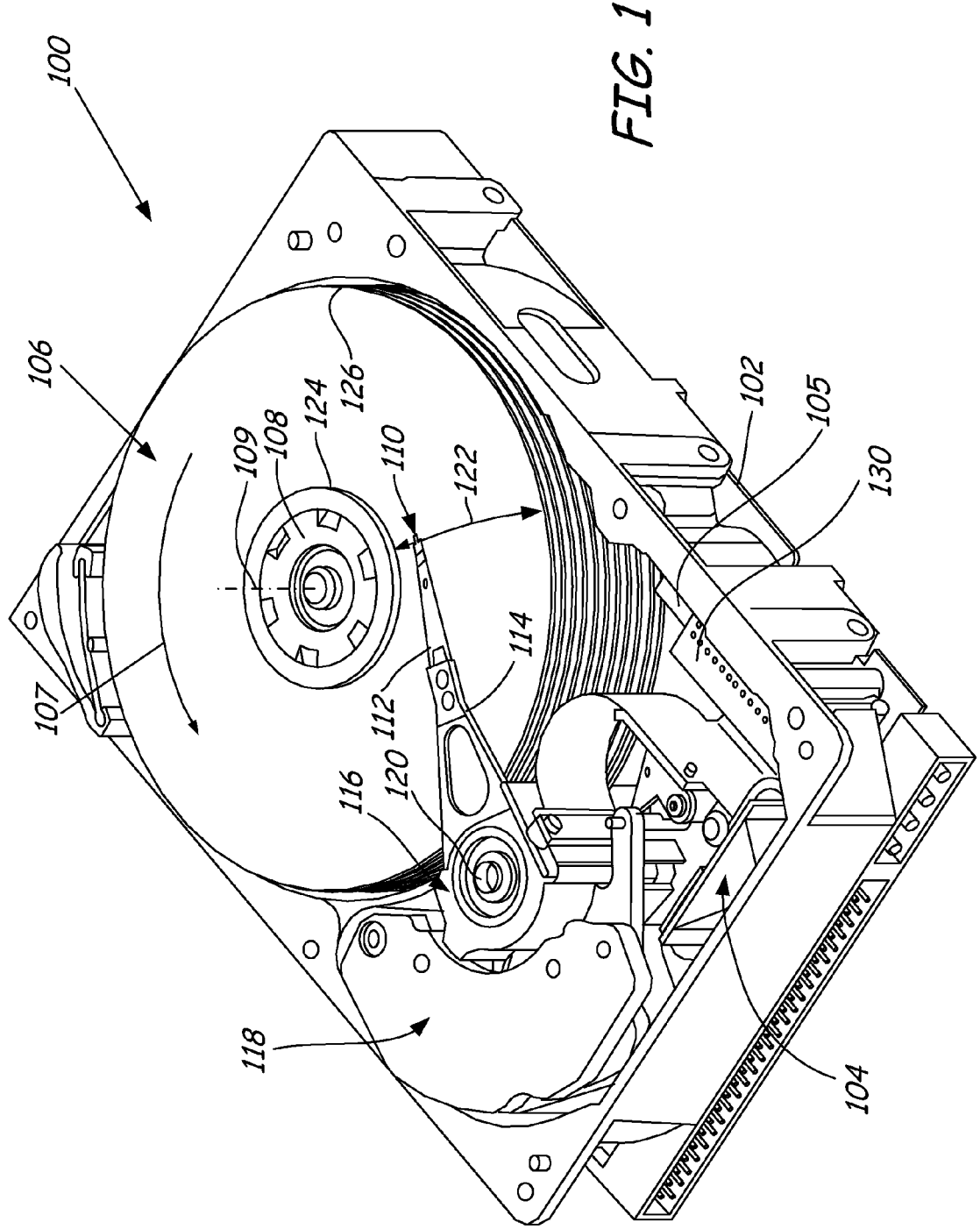
FIG. 1 is an oblique view of a disc drive that includes a humidity control device of the present invention.

Although an example embodiment of the humidity control device of the present invention is shown as being employed in a disc drive in FIG. 1, the humidity control device of the present invention can be employed in any enclosed system in which humidity control is desired. FIG. 1 illustrates an oblique view of a disc drive 100 in which embodiments of the present invention are useful. Disc drive 100 includes a housing with a base 102 and a top cover (not shown) that closes the housing to form an enclosed assembly. The housing 102 may include a breathing hole (such as 104) that is sealed with a porous filter that allows air and humidity to move in and out of the disc drive 100 as temperature or atmospheric pressure changes. It should be noted that some embodiments of disc drives, with which embodiments of the present invention are also useful, are hermetically sealed and therefore do not include a breathing hole. Disc drive 100 further includes a disc pack 106, which is mounted on a spindle motor (not shown) by a disc clamp 108. Disc pack 106 includes at least one disc, which is mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). Disc drive 100 also includes a humidity control device 105 of the present invention, which maintains relatively constant humidity conditions inside drive 100.

As mentioned above, prior art humidity control devices, utilized in enclosed assemblies such as disc drives, include seals, diffusion tubes, carbon absorbers, and desiccants. The effect of these elements is simply to delay changes in RH and not to control RH within a disc drive at a relatively constant level.

Under the present invention, a humidity control device (such as 105) is provided, which includes a container that is at least partially formed of a material through which water vapor can freely move. The humidity control device also includes a humidity-controlling mixture that comprises at least one salt and a superabsorbent polymer. The humidity-controlling mixture is enclosed within the container. The humidity control device can be easily installed in an enclosed assembly such as disc drive 100. Underlying principles upon which the design of the humidity control device of the present invention is based are provided below. Different embodiments of the humidity control device of the present invention are also described further below.

Consider a closed system comprised of an aqueous solution of a relatively non-volatile chemical species (or multiple species) and humid air. Over time, this system will come to equilibrium in which the partial pressure of water vapor in the air is completely determined by the temperature, total pressure, and the solute concentration. In the dilute-solution limit, the partial pressure of water vapor above the solution decreases linearly with increasing solute concentration (the mole fraction of solute), under constant temperature and pressure conditions. This phenomenon is known as Raoult's law. In general, there will be a departure from Raoult's law as the concentration of solute increases from the dilution limit to moderate or high levels; however, there is still a definite monotonic relationship between the solute concentration in the solution and the partial pressure of water vapor in the air at all solute concentration levels.

The amount of a non-volatile component (solute) that will dissolve in water is often limited. In such a case, as more and more solute is added to a given volume of water, a point will be reached when further solute will not dissolve and some pure solute will be present as a distinct phase. This condition is known as saturation. The amount of solute that can be dissolved in water (the solubility limit) depends on the temperature and on the chemical composition of the solute.

If, in the closed system, the solution is a saturated solution, there will be a three-way equilibrium among the partial pressure of water vapor in the air, the saturated solution of the solute dissolved in the water, and the pure solute present as a distinct, pure phase. In this case, the concentration of dissolved solute and the partial pressure of water vapor are not arbitrary but locked to specific values. This equilibrium state is stable, that is, the system will respond to perturbations by compensating changes in the opposing direction. Specifically, if the water vapor partial pressure in the closed system were increased by some artificial means, the solution would capture some water vapor from the air and dissolve more of the free solute. In this way, the partial pressure of water in the air and the concentration of solute would be driven back towards their original levels. An artificial decrease in the water vapor partial pressure would bring about the reverse process with some solute precipitating out of the solution and some liquid water evaporating to increase the water vapor partial pressure. In such a closed equilibrium system, the partial pressure of water vapor in the air is held to a specific value with little variation at substantially constant temperature.

Relative humidity (RH) is a direct function of the partial pressure of water vapor in the air. Therefore, the RH level of a closed equilibrium system comprised of humid air, aqueous solution, and free solute is fixed at a specific value. This RH value depends only on temperature and the solute used. (The dependence of equilibrium RH on total pressure is negligible). Below is a table (Table 1) for equilibrium humidity levels for saturated aqueous solutions of various salts at 25 degrees Celsius (° C.).

TABLE 1

| Salt | Equilibrium RH at 25° C. |
| --- | --- |
| Magnesium chloride ($MgCl_2$) | 32.8% |
| Potassium carbonate ($KCO_3$) | 43.2% |
| Sodium chloride (NaCl) | 75.3% |
| Potassium sulfate ($K_2SO_4$) | 97.3% |

These equilibrium RH levels are relatively insensitive to temperature. To illustrate this point, a saturated solution of $MgCl_2$ in water will control the relative humidity to 30.5% at 0° C. and to 33.7% at 50° C. This represents a very modest RH swing over a broad temperature range. This is an advantage since, in a practical device, maintenance of a constant level of relative humidity over the entire operating temperature range is desired. The average operating temperature range of a disc drive is between about −5° C. and 55° C. and therefore RH levels within this temperature range can be controlled effectively using the present invention. It should be noted that suitable humidity controlling mixtures can also be prepared, using the above principles, to provide humidity control for larger operating temperature ranges (−40° C. to 80° C., for example).

As mentioned above, in addition to at least one salt, the humidity-controlling mixture of the present invention also includes a superabsorbent polymer (such as polyacrylic acid (PAA) or polyacrylamide (PAM)). Advantages of using a mixture of a salt and a superabsorbent polymer include: 1) the equilibrium RH above the saturated solution remains constant as long as the solution remains saturated, 2) the adsorption of water over all RH ranges above the equilibrium RH of the unsaturated salt is very high, 3) as the humidity approaches 100%, the capacity of the superabsorbent polymer to adsorb water vapor drastically increases (goes above about 95%) and 4) the superabsorbent polymer eliminates the puddle formed when the salt adsorbs water.

Figure 2:
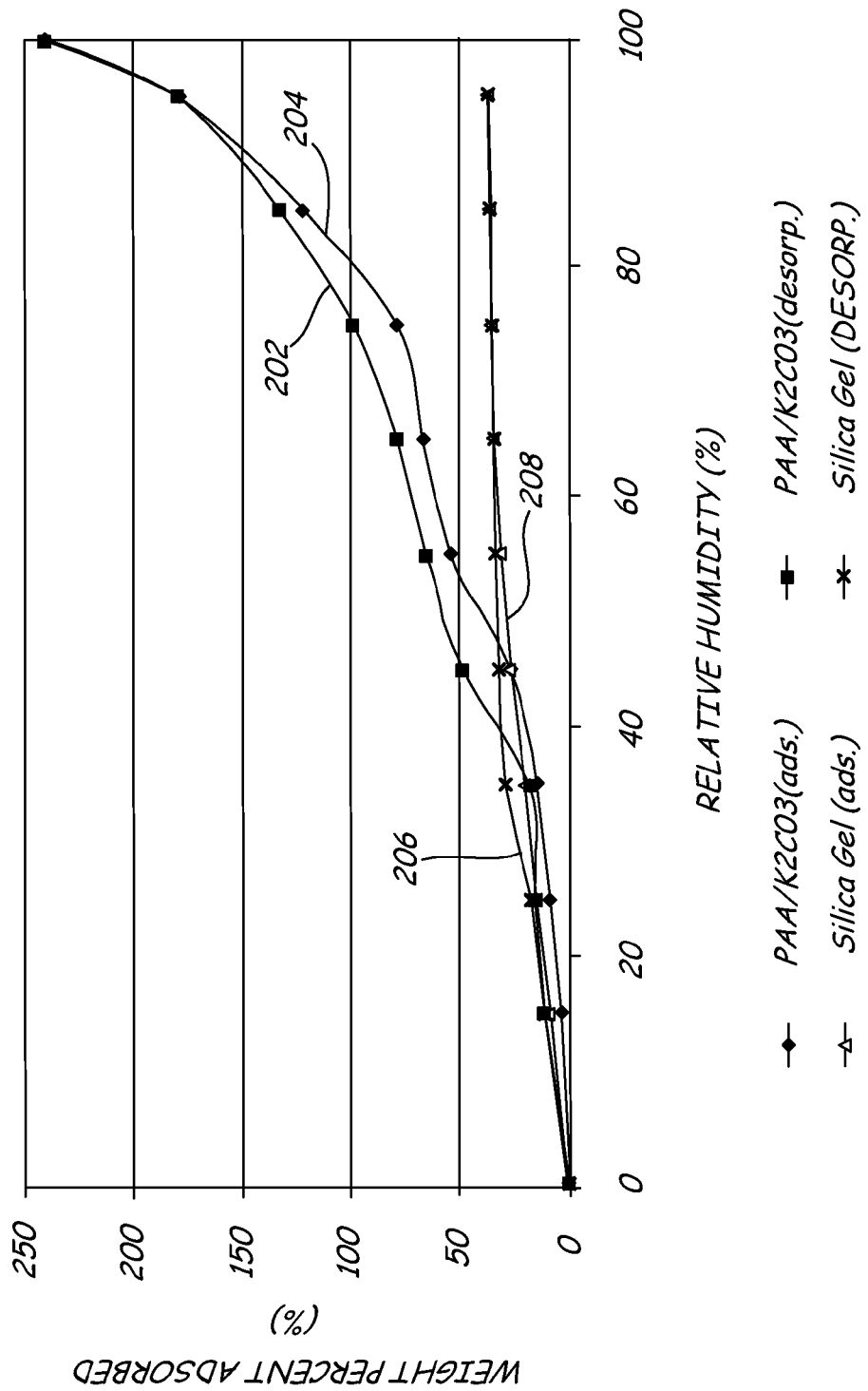
FIG. 2 illustrates plots of test results for humidity-controlling materials of the present invention and the prior art.

FIG. 2 illustrates plots of test results contrasting the humidity-controlling materials of the present invention and the prior art. As can be seen in FIG. 2, plots 202 and 204 represent adsorption (ads) and desorption (desorp) isotherms, respectively, for a PAA and $K_2CO_3$ mixture as embodied in the present invention. Plots 206 and 208 represent adsorption and desorption isotherms, respectively, for silica gel (prior art). From FIG. 2, it is clear that the humidity-absorption capability of the mixture of the present invention is substantially greater than that of the prior art silica gel.

Figure 5A:
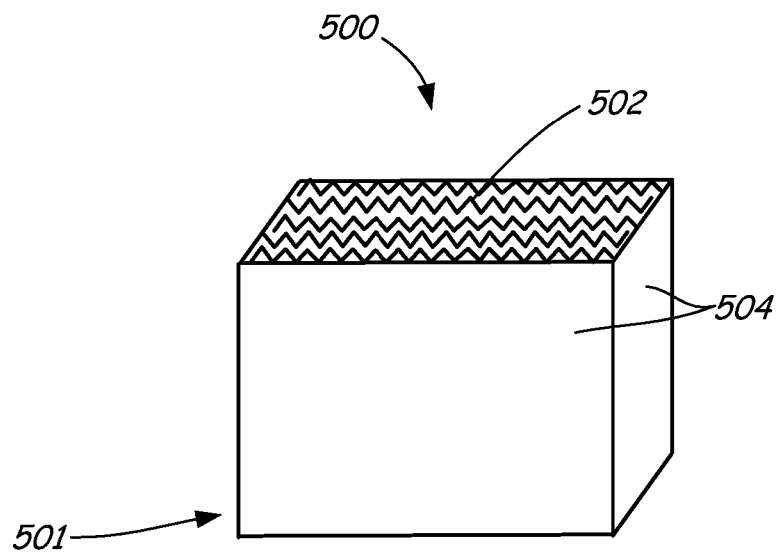
FIG. 5A is a diagrammatic view of another embodiment of a humidity control device of the present invention.
Figure 5B:
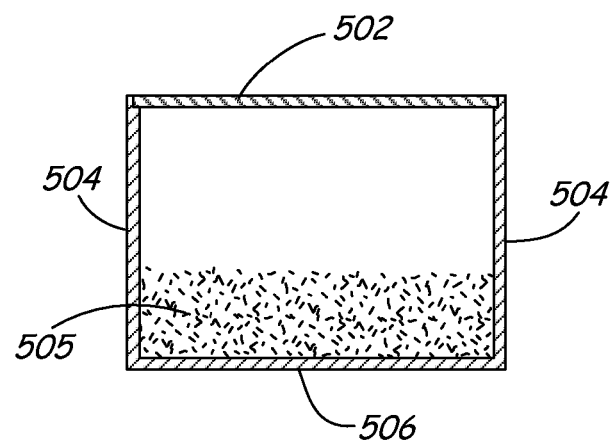
FIG. 5B is a cross-sectional view of the humidity control device of FIG. 3-1.
Figure 6:
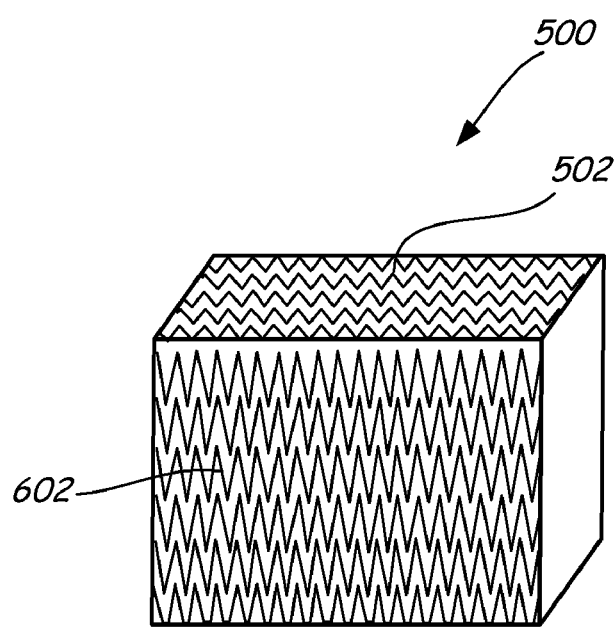
FIG. 6 is a diagrammatic view of another embodiment of a humidity control device of the present invention.

Different embodiments of humidity control devices, designed based upon the above principles, are described below in connection with FIGS. 3, 5 and 6.

Figure 3:
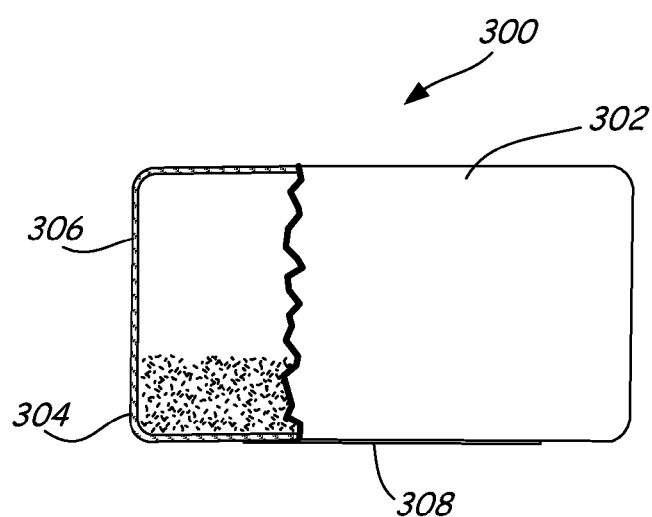
FIG. 3 is a partial cross-sectional view of an embodiment of a humidity control device of the present invention.

FIG. 3 is a partial cross-sectional view of an embodiment of a humidity control device 300 of the present invention. The same reference numerals are used to represent the same or similar elements in the different embodiments of the humidity control device. In FIG. 3, the container of humidity control device 300 is a pouch 302 formed substantially completely of a vapor-permeable fabric 306 such as polytetrafluoroethylene (PTFE). Humidity-controlling mixture 304 is included within pouch 302. In embodiments of the present invention, humidity-controlling material 304 is a mixture of at least one salt and a superabsorbent polymer. The at least one salt may be selected from salts such as magnesium chloride, potassium carbonate, sodium chloride and potassium sulfate (Table 1 above). As mentioned above, examples of superabsorbent polymers include PAA and PAM. As can be seen in FIG. 3, humidity control device 300 also includes a mounting element 308 for mounting device 300 within an enclosed assembly such as disc drive 100. In some embodiments, mounting element 308 is an adhesive layer. Adhesive layer 308 may be a pressure sensitive adhesive or VELCRO® mounting or, in general, any type of hook and loop mounting mechanism may be utilized. In other embodiments, mechanical means for attaching the container (screws, clamps, clips, interference fits, wedges, etc.) may be employed as element 308.

In a disc drive application, the saturated solution in the humidity control device would counter changes in RH due to transport of water vapor into or out of the disc drive housing in order to maintain constant humidity conditions inside within tight limits over the entire operating temperature range. It should be noted that both intentional and unintentional paths for ongoing ingress or egress of moisture are usually present in a disc drive. Diffusion through a port in the disc drive and permeation through seals, gaskets, etc., are examples of how moisture can reach the drive interior. Given a particular head/disc interface (HDI) design, an appropriate solute species that gives the desired RH level for that design is selected.

It should be noted that a special saturated solution need not be prepared for application in a disc drive; within a broad range of conditions, the system will equilibrate to an appropriate RH level regardless of the initial condition of the material. For example, a mass of dry salt would absorb water from the air and form a puddle of saturated solution that would control the disc drive internal RH to the desired level. Moreover, some anhydrous salts, such as $CaCl_2$ may also undergo an irreversible hydration process (at a standard operating temperature of the disc drive) that would absorb yet more water from the air. This latter process may aid in cases where hard disc drives are stored for long periods in hot, wet conditions where extreme protection from moisture is desired.

Figure 4:
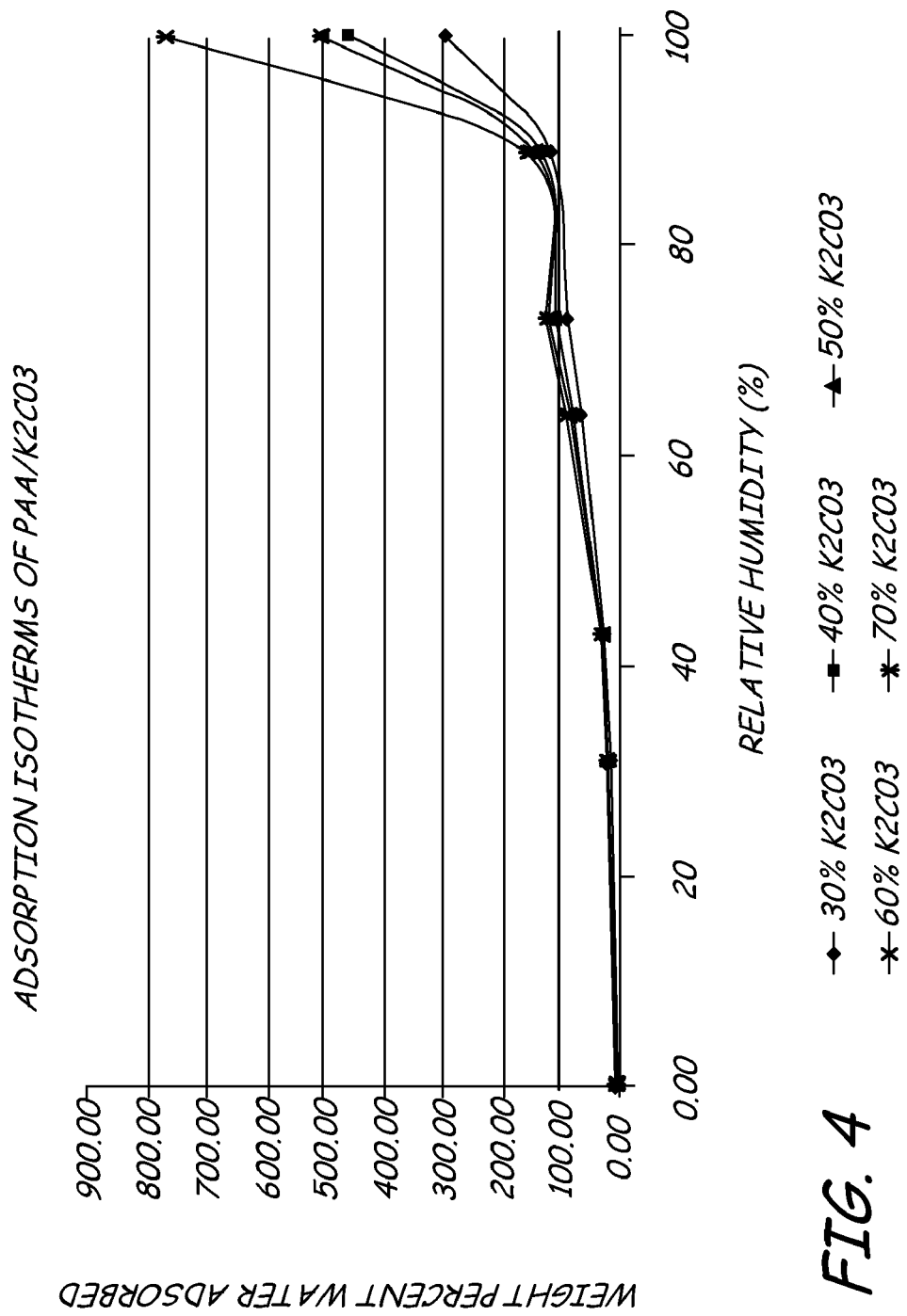
FIG. 4 illustrates adsorption isotherm plots for different mixtures of a salt and a superabsorbent polymer by weight.

As mentioned above, humidity-controlling mixture 204 includes a salt and a superabsorbent polymer. The salt and polymer are typically intimately mixed. One technique for intimately mixing the salt and the polymer includes dissolving the salt in water, adding the polymer, which rapidly adsorbs the salt solution, and then drying the mixture. In some embodiments, the raw dry salt and polymer powders are mixed. Depending upon the type of application, a 30/70, 40/60, 50/50, 60/40 or 70/30 mixture of the polymer and the salt by weight may be utilized. Although the above mixtures of the polymer and the salt by weight have been found to be suitable as a result of tests that were carried out, it should be noted that any suitable mixture of the polymer and the salt may be utilized. Adsorption isotherms of different mixtures of PAA and K2CO3 by weight are shown in FIG. 4.

In some embodiments of the present invention, to improve performance, a mixture of multiple salts (potassium carbonate and potassium bicarbonate, for example) and the superabsorbent polymer may be utilized. It should be noted that utilizing potassium carbonate, or any other carbonate, also provides a very high capacity for absorbing acid gases, such as HCl, $SO_2$, NOx, etc. Therefore, such mixtures help absorb contaminants (such as $H_2S$) that may be outgassed due to interaction between components within the disc drive. They also help absorb similar contaminants that may enter from outside the drive.

In the embodiment of the humidity control device shown in FIG. 3, as mentioned above, the container of device 300 is formed substantially completely of vapor-permeable membrane 306. However, in some embodiments, the container may be formed of an impermeable material with a window (or small portion) formed of a vapor-permeable membrane. FIGS. 5A and 5B are diagrammatic and cross-sectional views, respectively, of one such embodiment. Here, humidity control device 500 is a box including a machined or molded portion 501 that is sealed with a permeable membrane or fabric 502, such as PTFE. Membrane 502 forms the top of the box and portion 501 forms side walls 504, and bottom 506, of the box. Portion 501 may be formed of plastic, for example. As can be seen in FIG. 5B, the interior of humidity control device 500 includes humidity-controlling mixture 505, which comprises a salt and a superabsorbent polymer. A mounting element (not shown in FIGS. 5A and 5B) may be attached to bottom 506 of humidity control device 500 for mounting in an enclosed assembly such as disc drive 100.

Additional features might be incorporated into the above-described embodiments to enhance the overall functionality of the humidity control device. In some embodiments, side walls 504 may be formed of an elastic material to accommodate changes in volume within humidity control device 500 due to condensation of water vapor into and/or evaporation of water out of humidity-controlling mixture 505 within humidity control device 500. Humidity control device 500, described above and shown in FIGS. 5A and 5B, includes a single vapor-permeable membrane or patch 502 that forms the top of the container or box. Here, there may be the potential for stratification of the solution by gravity. For some container orientations, condensation of water vapor may only occur near the liquid free surface, giving a reduced concentration of solute, and hence reduced capacity for RH control, there. This problem may be avoided by having vapor-permeable membrane patches located on various faces of the container that would allow water to be absorbed into the solution away from the free surface. FIG. 6 shows a diagrammatic view of a humidity control device 600 that includes vapor-permeable membrane 502 and an additional vapor-permeable patch 602 on a side wall (such as 504 (FIG. 5)). Convection currents driven by solution density gradients in the system of FIG. 6 would tend to de-stratify the solution; the system would be self-stirring. Such a system could be designed to work under any container orientation.

In order to judge the feasibility of the above-described humidity control device of the present invention, some standard form-factor (3.5-inch) hard disc drives were fitted with containers sealed with vapor-permeable membrane material. These containers had an internal volume of approximately 2 cubic centimeters and were filled with an aqueous solution of sodium sulfate ($Na_2SO_4$) or magnesium chloride ($MgCl_2$) containing surplus solid salt. After equilibrating the hard drives at 25° C. and 40% RH, they were challenged by a 25° C. and 90% RH environment. These test disc drives were instrumented with temperature and RH sensors so that the internal state of the drives could be monitored. Results of these tests are presented in FIG. 7.

Figure 7:
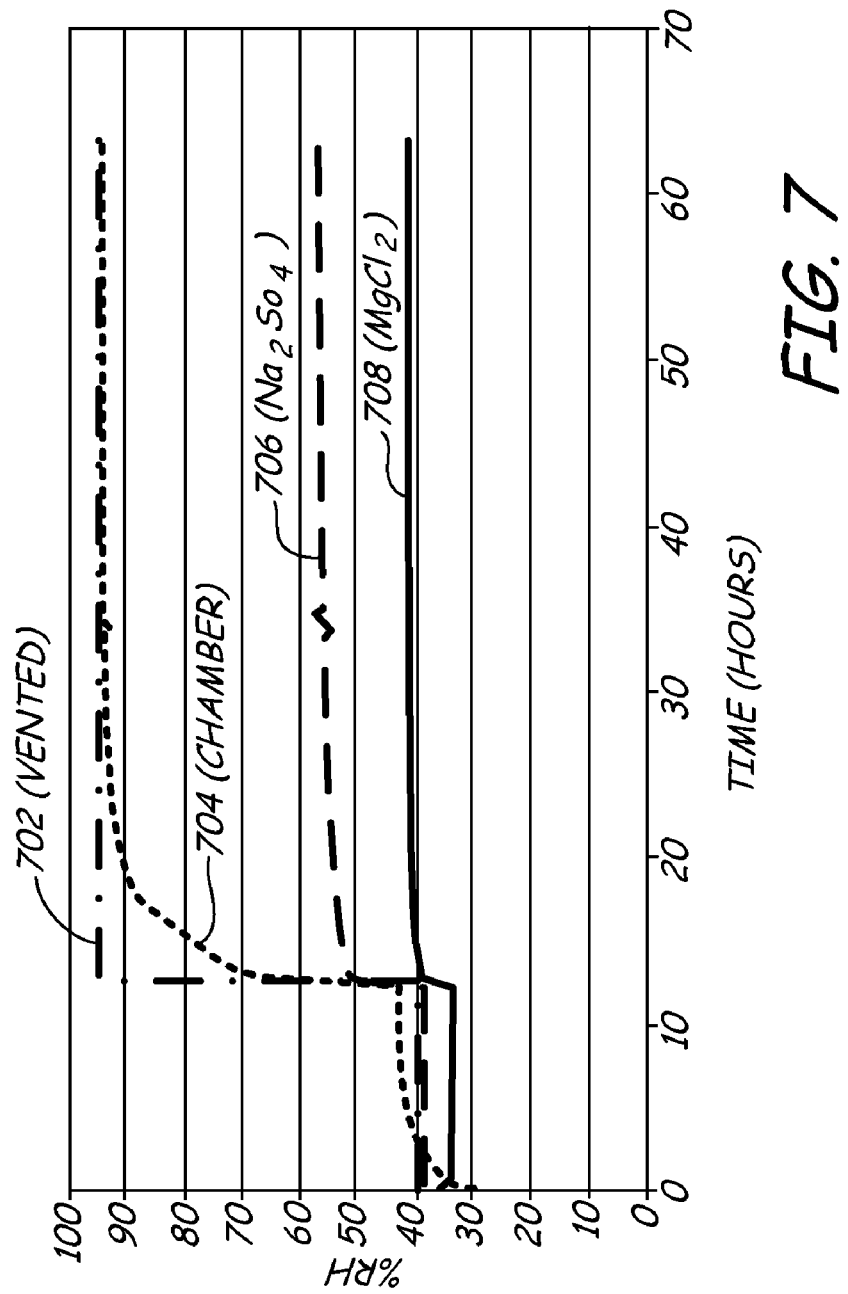
FIGS. 7 and 8 is a graphical represent of test results obtained for a disc drive with and without a humidity control device of the present invention.

Referring now to FIG. 7, it can be seen that the RH levels of both the test drives fitted with prototype humidity control devices of the present invention (plots 706 and 708) performed very well, relative to a drives without an absorber (plots 702 and 704). Time-RH profiles (706 and 708) for the drives fitted with the humidity control devices of the present invention are very flat showing that RH can be controlled within tight limits.

Figure 8:
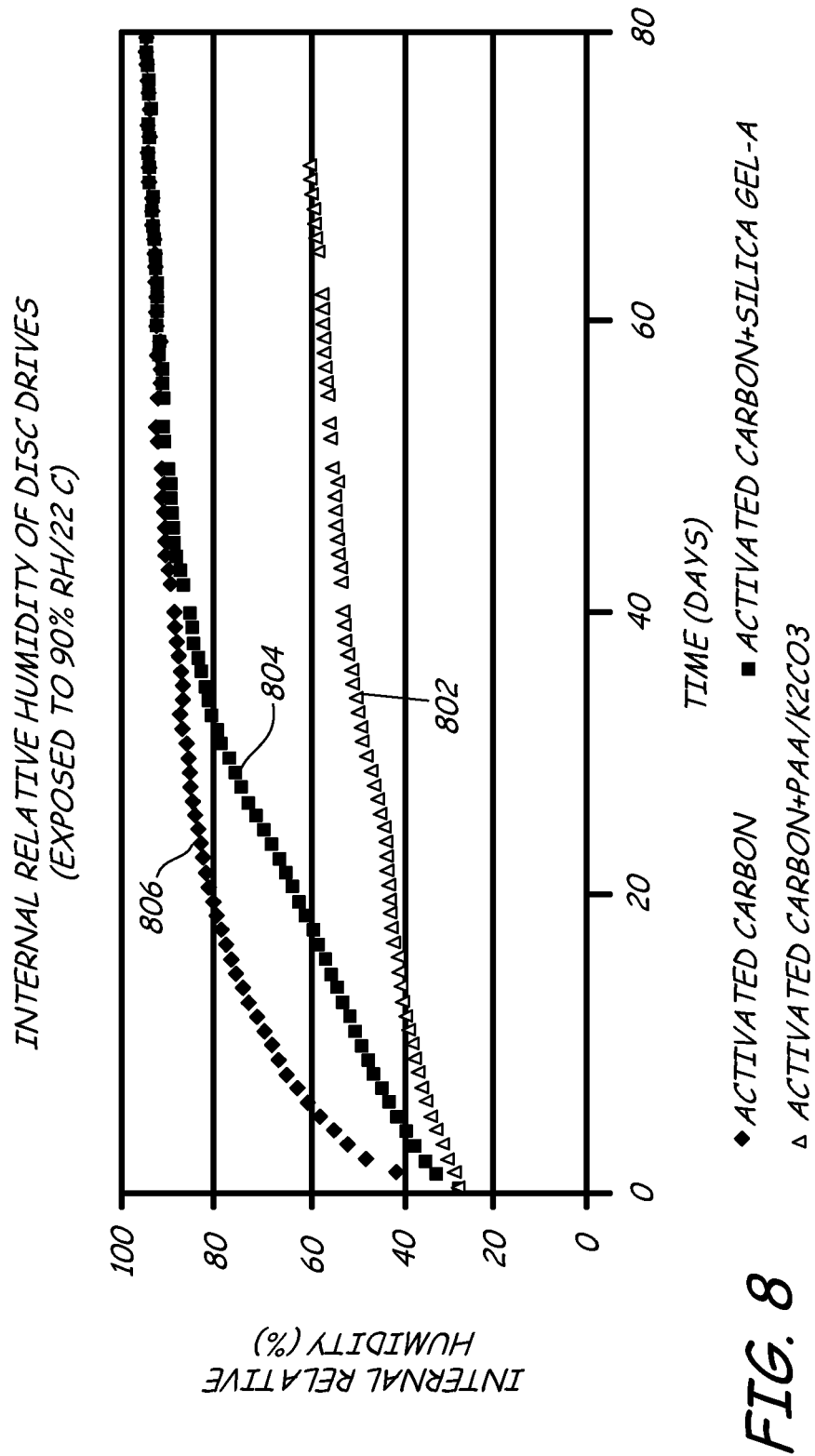

FIG. 8 includes plots similar to those of FIG. 7. As can be seen in FIG. 8, a test disc drive fitted with a prototype humidity control device of the present invention having a humidity-controlling mixture including activated carbon, PAA and K2CO3 (plot 802) performed substantially better than humidity control devices of the prior art (plot 804 represents results for a humidity control device including activated carbon and silica gel-A and plot 806 represents a similar device including only activated carbon).

Position of the Humidity Control Device

Referring back to FIG. 1, humidity control device 105 is shown within housing 102 in a position proximate disc pack 106. In general, humidity control device 105 can be mounted in any suitable position within disc drive 100. For example, in some embodiments, humidity control device 105 may be positioned such that it serves as the porous filter that covers breathing hole 104 (FIG. 1).

Potential Benefits of the Solution

Control of RH levels within the drive should increase the reliability by reducing the failure rate from mechanisms aggravated by RH extremes. Control of RH levels within the drive should enable increased performance of the recording subsystem by allowing a reduction in the thickness of protective coatings on both media and heads, such as diamond-like carbon, lubricant, and others. At a given nominal head fly-height, a reduction in coating thickness will increase the read/write signal strength relative to noise.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the humidity control system while maintaining substantially the same functionality without departing from the scope and spirit of the present invention. In addition, although the preferred embodiment described herein is directed to a humidity control system for a disc drive, it will be appreciated by those skilled in the art that the teachings of the present invention can be applied to any enclosed system within which humidity control is desired, without departing from the scope and spirit of the present invention. In addition to the above-noted salts, any salt or combination of salts that have one or more of the above-listed properties can be utilized along with the super-absorbent polymer, without departing from the scope and spirit of the present invention. Although the preferred embodiment utilizes a container that is at least partially formed of a vapor-permeable membrane, in general, any material, through which water vapor can freely move, may be utilized.

What is claimed is:

1. A method for maintaining a relatively constant humidity in an enclosure, the method comprising:
    dissolving a free solute of a multi-phase salt mixture in response to an increase in water vapor pressure;
    precipitating dissolved solute out of solution in response to a decrease in vapor pressure; and
    utilizing a superabsorbent polymer to adsorb excess solvent in the multi phase salt mixture.

2. The method of claim 1 wherein the multi-phase salt mixture comprises a plurality of salts.

3. The method of claim 2 wherein the plurality of salts comprises potassium carbonate and potassium bicarbonate.

4. A humidity control device comprising:
    a container that is at least partially formed of a material through which water vapor can freely move; and
    a humidity-controlling mixture within the container, the humidity controlling mixture comprising:
        a saturated aqueous solution of a plurality of salts in intimate contact with excess solid of the same plurality of salts; and
        a super-absorbent polymer.

5. The device of claim 4 wherein the plurality of salts comprises potassium carbonate and potassium bicarbonate.

6. The device of claim 4 wherein the container that is at least partially formed of a vapor-permeable membrane.

7. The device of claim 6 wherein the vapor-permeable membrane comprises polytetrafluoroethylene.

* * * * *